United States Patent
Dhodapkar et al.

(10) Patent No.: US 8,335,218 B2
(45) Date of Patent: Dec. 18, 2012

(54) METHODS AND DEVICES FOR RESTORING SESSION STATE

(75) Inventors: Chinmay S. Dhodapkar, San Diego, CA (US); Vidyadhar Kamath, San Diego, CA (US); Karthik Balu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 12/751,689

(22) Filed: Mar. 31, 2010

(65) Prior Publication Data

US 2010/0260038 A1    Oct. 14, 2010

Related U.S. Application Data

(60) Provisional application No. 61/168,863, filed on Apr. 13, 2009.

(51) Int. Cl.
*H04L 12/56*    (2006.01)
(52) U.S. Cl. .................................................. 370/395.2
(58) Field of Classification Search ...................... None
See application file for complete search history.

(56) References Cited

U.S. PATENT DOCUMENTS

| | | | |
|---|---|---|---|
| 5,392,278 A | 2/1995 | Teel et al. | |
| 7,170,863 B1 | 1/2007 | Denman et al. | |
| 2005/0108250 A1* | 5/2005 | Hunt | 707/10 |
| 2007/0071179 A1* | 3/2007 | Fukazawa et al. | 379/32.01 |
| 2007/0071191 A1* | 3/2007 | Sasaki et al. | 379/93.09 |
| 2007/0157301 A1 | 7/2007 | Taglienti et al. | |
| 2009/0049180 A1* | 2/2009 | El et al. | 709/227 |
| 2010/0064130 A1* | 3/2010 | Borisov | 713/151 |
| 2011/0179461 A1* | 7/2011 | Foti | 725/109 |

OTHER PUBLICATIONS

International Search Report and Written Opinion—PCT/US2010/030810, International Search Authority—European Patent Office—Aug. 13, 2010.

* cited by examiner

*Primary Examiner* — Chirag Shah
*Assistant Examiner* — Amar Persaud
(74) *Attorney, Agent, or Firm* — Raphael Freiwirth (57) ABSTRACT

Methods, systems and devices are provided for restoring a multiple call session. A communication terminal can restore a multiple call session after a fault. A network interface can couple the terminal to a network including multiple access terminals associated with the multiple call session. A request for a state of the multiple call session can be transmitted and received by a server in the network. A response including the state can be received. The multiple call session can be restored based on the state of the multiple call session and other information.

26 Claims, 10 Drawing Sheets

METHODS AND DEVICES FOR RESTORING SESSION STATE

CLAIM OF PRIORITY UNDER 35 U.S.C. §119

The present Application for Patent claims priority to Provisional Application No. 61/168,863 entitled "METHODS AND PROTOCOLS FOR RESTORING SESSION STATE IN A DISPATCH CONSOLE IN A PUSH-TO-TALK (PTT) ENVIRONMENT" filed Apr. 13, 2009, and assigned to the assignee hereof and hereby expressly incorporated by reference herein.

FIELD OF DISCLOSURE

The invention relates to restoring session state in a dispatch console operating in a push-to-talk (PTT) environment and interfacing with PTT servers and gateways.

BACKGROUND

Wireless communication systems have developed through various generations, including a first-generation analog wireless phone service (1G), a second-generation (2G) digital wireless phone service, including interim 2.5G and 2.75G networks, and a third-generation (3G) high speed data Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 such as CDMA2000 1xEV-DO standards, for example, or TD-SCDMA.

In wireless communication systems, mobile stations, handsets, or access terminals (AT) receive signals from fixed position base stations, which can also be referred to as cell sites or simply cells that support communication links or service within particular geographic regions adjacent to or surrounding the base stations. Base stations provide entry points to an access network (AN) such as a radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints, which can be, for example, ATs, occurs within virtual groups, where the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become increasingly important. Accordingly, protocols have been adopted to support concurrent data transmissions of the same packet or message to multiple destinations or target access terminals. A "broadcast" refers to a transmission of data packets to all destinations or access terminals such as within a given cell, served by a given service provider, and the like, while a "multicast" refers to a transmission of data packets to a given group of destinations or access terminals. In an example, the given group of destinations or "multicast group" may include more than one and less than all of possible destinations or access terminals within a given group, served by a given service provider and the like. However, it is at least possible in certain situations that the multicast group comprises only one access terminal, similar to a unicast, or alternatively that the multicast group comprises all access terminals within a given cell similar to a broadcast.

In addition to various transmission schemes that may be used such as unicast, multicast, broadcast as described herein, a PTT call may also be a half duplex or a full duplex communication for at least some of the participants. Generally, a PTT call corresponds to a server mediated communication between two or more identified access terminals, regardless of the various configurations used to conduct the PTT calls. A dispatch console can often serve as the mediating server or entity for multiple calls including PTT calls. Difficulties can arise in circumstances where a dispatch console enters a faulty state such as a software crash, reboot, power failure or the like. In such circumstances, the dispatch console can lose information about the state of the PTT call including call states and the like. When a dispatch console restarts after a failure the reset user interface of the dispatch console is inconsistent with the actual state of the call including call clients that were added or dropped while the dispatch console was down, and synchronization of any content, such as multimedia content that was being streamed during the outage. While protocols exist for call set up, there is a need to manage the restoration of calls when an entity such as a dispatch console fails and is either restarted or the session resumed on a new console.

SUMMARY

Therefore, in accordance with various embodiments a communication terminal can be provided for restoring a multiple call session after a fault. The exemplary terminal can include a user interface, such as, an input device, keyboard, mouse, microphone and the like, and an output device, display, and the like. A network interface capable of coupling the communication terminal to a network including multiple access terminals associated with multiple calls of the multiple call session can be provided. A processor can be coupled to the user interface and the network interface. The processor can be configured to transmit a request to a server in the network. The request can include a user identifier associated with a user of the communication terminal and can be for a state of the multiple call session associated with the user identifier prior to the fault. A response can be received from the server including the state of the multiple call session associated with the user identification and the state can be displayed on the output device. The displayed state can include individual states of the multiple calls of the multiple call session. The multiple call session can be restored on the communication terminal based on the state of the multiple call session and based on input received from the input device. For example, if ones of the multiple calls of the multiple call session have dropped during the duration of the fault, then those calls need not be restored.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
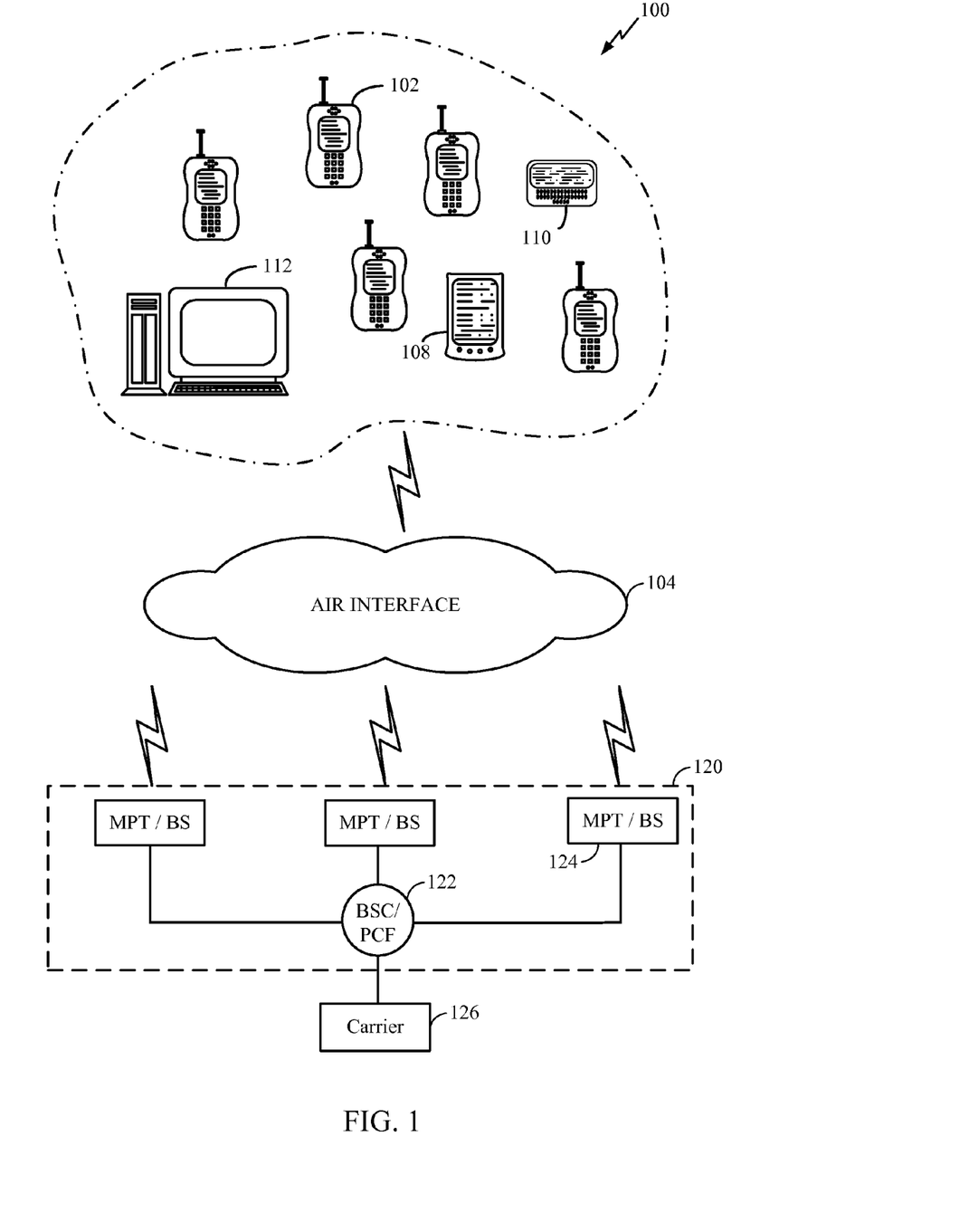
FIG. 1 is a diagram illustrating an exemplary wireless network architecture that supports access terminals and access networks.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network such as an intranet, the Internet, and/or carrier network 126, and the access terminals 102, 108, 110, 112. As shown in the figure, the access terminal can be a cellular telephone 102, a personal digital assistant 108, a pager 110, which is shown here as a two-way text pager, or even a separate computer platform 112 that has a wireless communication portal. Embodiments can thus be realized on any form of access terminal that includes a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages sent to a base station controller/packet control function (BSC/PCF) 122, which messages are typically sent as data packets. The BSC/PCF 122 is responsible for signaling, establishing or setting up and tearing down data channels, such as bearer channels, between a packet data service node 100 ("PDSN") and the access terminals 102, 108, 110, and 112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in an embodiment the functionality of the BSC/PCF 122 and one or more of the MPT/BS 124 may be collapsed into a single "hybrid" module having the functionality of both the BSC/PCF 122 and the MPT/BS 124.

Figure 2A:
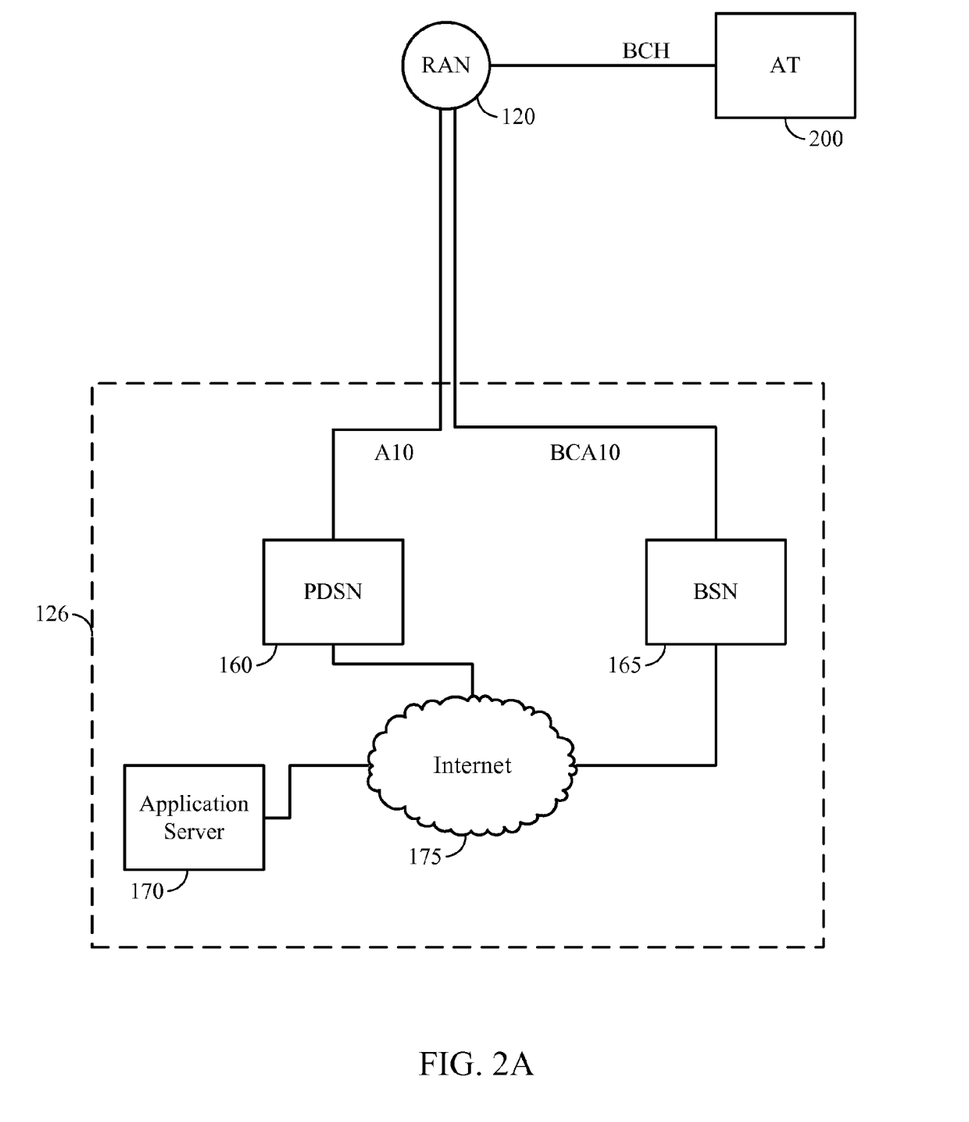
FIG. 2A is a diagram illustrating portions of an exemplary carrier network.

FIG. 2A illustrates the carrier network 126 according to an embodiment that includes a packet data serving node (PDSN) 160, a broadcast serving node (BSN) 165, an application server 470 and an Internet 175. In alternative embodiments, application server 470 and other components may be located outside the carrier network. The PDSN 160 provides access to the Internet 175, intranets and/or remote servers such as application server 470, for mobile stations including access terminals such as 102, 108, 110, 112 from FIG. 1, that utilize, for example, a cdma2000 Radio Access Network (RAN) such as RAN 120 of FIG. 1. Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with portions of the RAN 120 such as the BSC/PCF 122, via a conventional A10 connection, which, since well-known in the art and for the sake of brevity, will not be described further.

Referring to FIG. 2A, the broadcast serving node (BSN) 165 may be configured to support multicast and broadcast services. The BSN 165 communicates with the RAN 120, such as by way of the BSC/PCF 122), via a broadcast (BC) A10 connection, and with the application server 470 via the Internet 175. The BCA10 connection is used to transfer multicast and/or broadcast messaging. Accordingly, the application server 470 may send unicast messaging to the PDSN 160 via the Internet 175, and may send multicast messaging to the BSN 165 via the Internet 175.

Figure 2B:
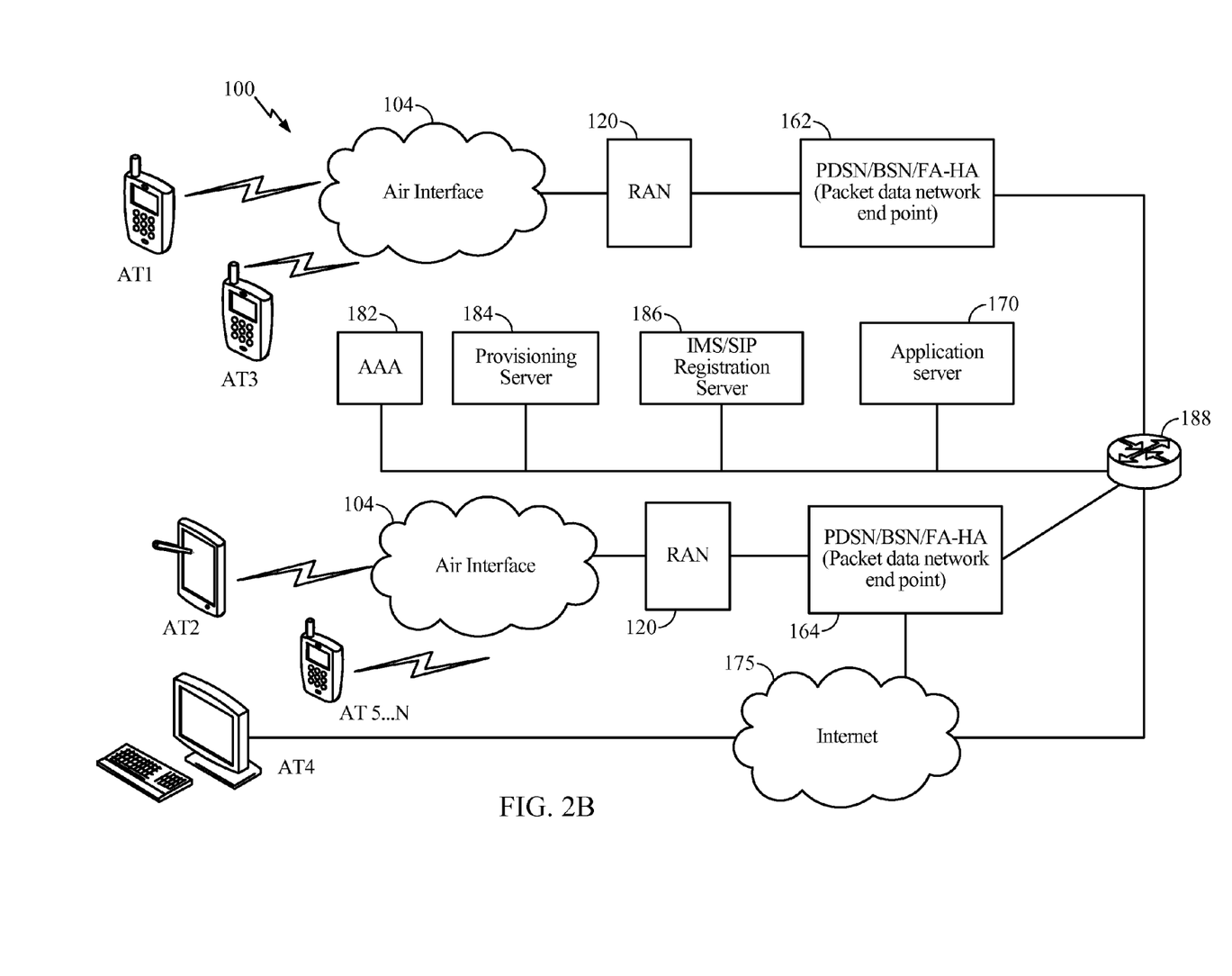
FIG. 2B is a diagram illustrating a more detailed example of a wireless communication arrangement 100 of FIG. 1.

FIG. 2B illustrates an example of the wireless communication system 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162, which may correspond to PDSN 160, BSN 165, a home agent (HA), a foreign agent (FA), and the like. The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 470. ATs 2 and 5 . . . N connect to the RAN 120 at a portion served by a second packet data network end-point 164, which may correspond to PDSN 160, BSN 165, FA, HA, and the like. Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 470. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 470 are each illustrated as structurally separate servers, one or more of these servers may be consolidated in at least one embodiment of the invention.

Figure 3A:
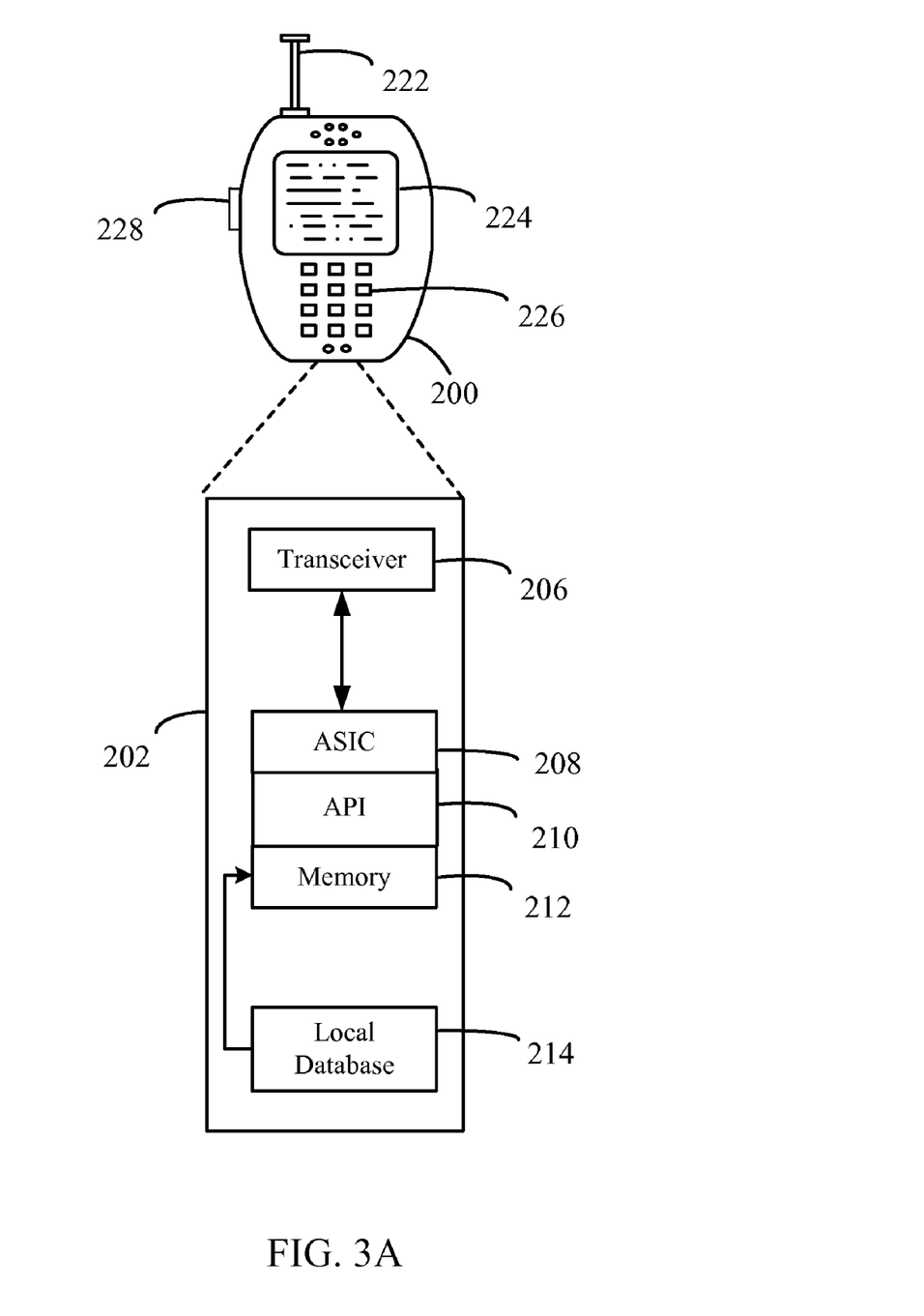
FIG. 3A is a diagram illustrating portions of an exemplary access terminal.

Referring to FIG. 3A, an access terminal 200, shown in the figure as a wireless device, such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor can execute programs, applications, or the like, developed in accordance with an application programming interface ("API") 210 layer that can be used to develop programs, applications or the like, to interface with any resident programs in the memory 212 of the wireless device such as an operating system or the like. The memory 212 can include read-only or random-access memory (RAM and ROM), EEPROM, flash memory cards, or any memory common to computer platforms. The platform 202 also can include a local database 214 that can hold applications and other data not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment can include an access terminal including the ability to perform the functions described herein through operation of hardware, software or a combination thereof. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute program instruction for carrying out the various functions disclosed herein and thus the logic to perform these functions may be distributed over various elements. Alternatively, the functionality could be incorporated into one discrete component. Therefore, the features of the access terminal in FIG. 3A are to be considered merely illustrative and the invention is not limited solely to the illustrated features or arrangement.

Figure 3B:
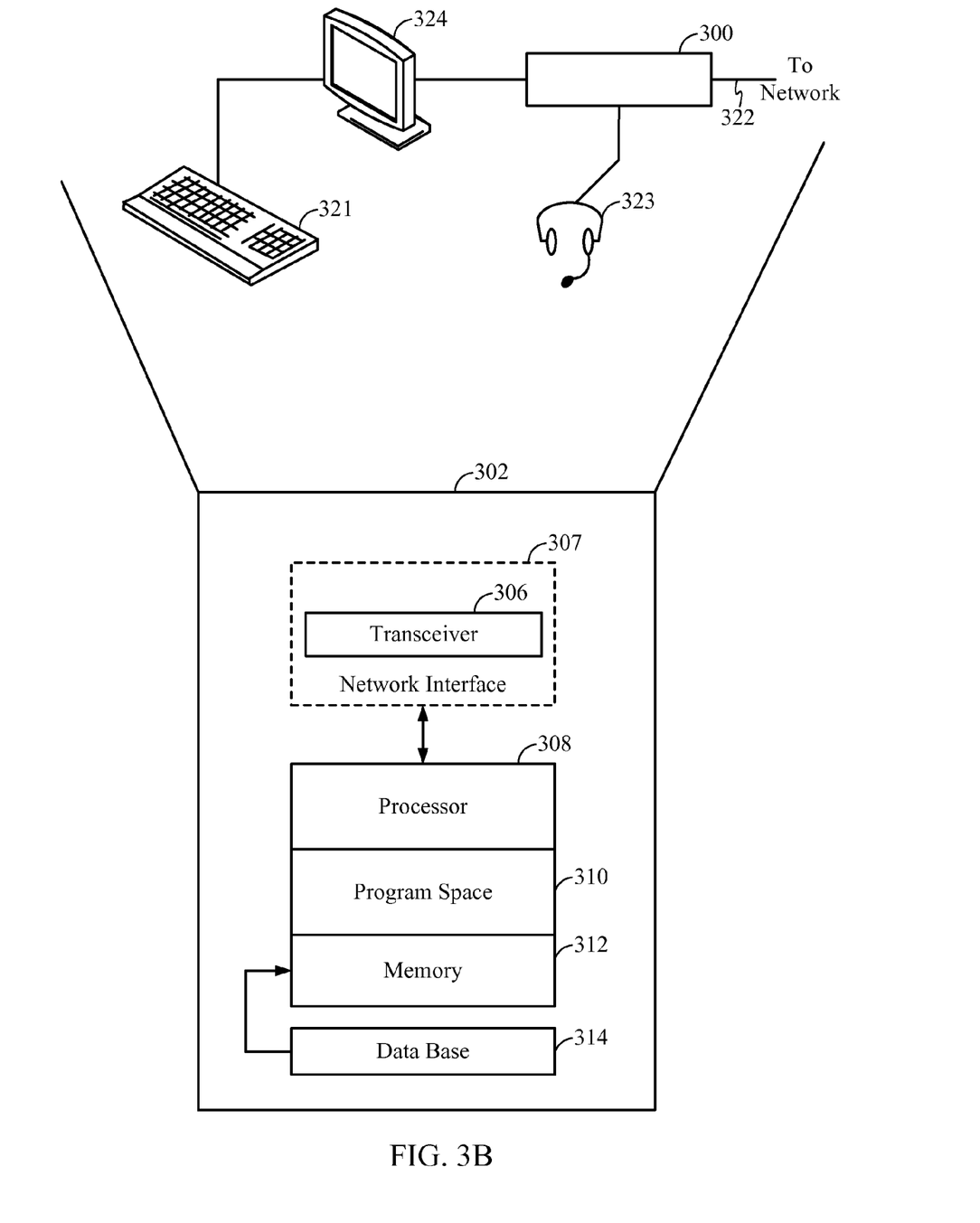
FIG. 3B is a diagram illustrating portions of an exemplary access terminal embodied as a dispatch console.

Referring to FIG. 3B, an access terminal embodied as a dispatch console 300, has a hardware platform 302 capable of coupling with a network either in a wired or wireless fashion or in both a wireless and wired fashion and performing processing functions. It is possible that the platform 203 can couple with a network such as the Internet or an intranet, and also couple to a wireless network. The platform 302 can receive and execute software applications, and can transmit and receive data and/or transmit commands and receive messages from, for example, other access terminals and equipment coupled to the RAN 120. It will be appreciated that message and command interchange may further ultimately be conducted with the carrier network 126, the Internet and/or other remote servers and networks. The platform 302 can include a transceiver 306 that, in the present embodiment and other embodiments, may be part of or may be coupled to a network interface 307 that is capable of coupling with a network. The transceiver 306 and the network interface 307 may be operably coupled to an processor 308 that can be an application specific integrated circuit (ASIC), or other processor, microprocessor, logic circuit, data processing device, or the like. The processor 308 can execute programs, applications, or the like, that may reside in program space 310. The programs can be developed in accordance with an application programming interface ("API") layer that can be used to develop programs, applications or the like. The program space 310 can interface with data or any other resident programs in the memory 212 such as an operating system or the like. The memory 312 can include read-only or random-access memory (RAM and ROM), EEPROM, flash memory cards, or any memory common to computer platforms. The platform 302 also can include a local database 314 that can hold applications, user preferences, user identification information, group identification information, and other data. The local database 314 can be any secondary storage device as known in the art, such as magnetic media, EEPROM, optical media, tape, soft or hard disk, flash memory, or the like. The platform 302 in some exemplary embodiments components can also be operably coupled to external devices such as a wired or wireless, or wired and wireless network interface connection 322, display 324, keyboard 321, headset 323, and other components as is known in the art.

Accordingly, an access terminal can be embodied as a dispatch console including the ability to perform the functions described herein through operation of hardware, software or a combination thereof. As will be appreciated by those skilled in the art, the various logic elements can be embodied in discrete elements, software modules executed on a processor or any combination of software and hardware to achieve the functionality disclosed herein. For example, processor 308, memory 312, software space 310 and local database 314 may all be used cooperatively to load, store and execute program instruction for carrying out the various functions disclosed herein and thus the logic to perform these functions may be distributed over various elements. Alternatively, the functionality could be incorporated into one discrete component. The features of an exemplary dispatch console, for example as illustrated in FIG. 3B, are to be considered merely illustrative. The invention is therefore not limited solely to the illustrated features or arrangement.

Figure 3C:
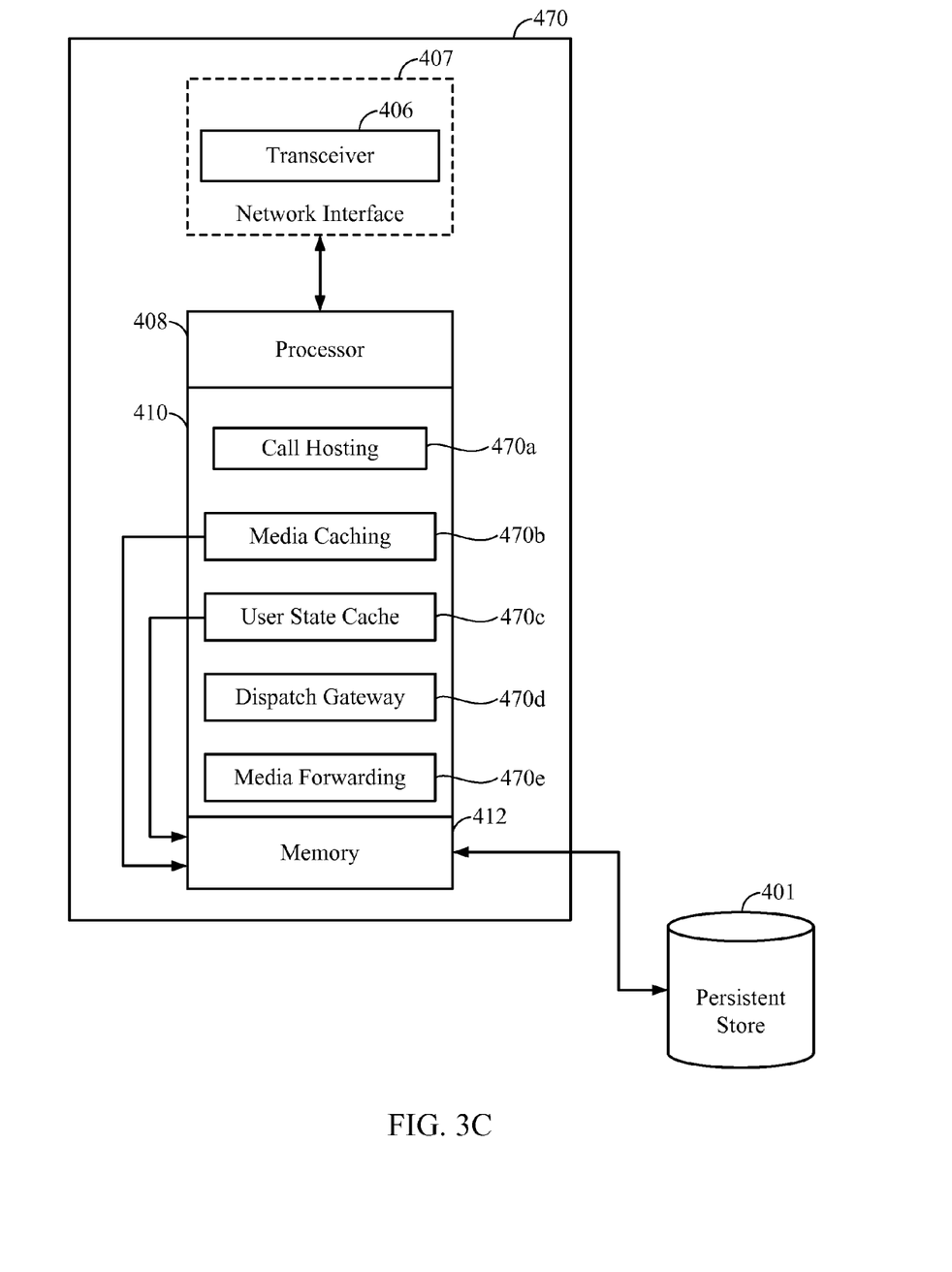
FIG. 3C is a diagram illustrating portions of an exemplary server.

Referring to FIG. 3c, an exemplary server 470, has a hardware platform capable of coupling with a network either in a wired or wireless fashion or in both a wireless and wired fashion and performing processing functions. It is possible that the server 470 can couple with a network such as the Internet or an intranet, and also couple to a wireless network such as network 426 describer hereinafter, for example through a call hosting function 470a that can be a module within the server 470 or can be managed as an external resource by the server. The server 470 can include a media caching module 470b, a user state caching module 470c, a dispatch gateway module 470c, and a media forwarding module all of which are described in greater detail hereinafter.

The platform can receive and execute software applications, such as associated with the above described modules 470a-470e, and can transmit and receive data and/or transmit commands and receive messages from, for example, other access terminals and equipment coupled thereto and to, for example, the RAN 120. It will be appreciated that message and command interchange may further ultimately be conducted with the carrier network 126, the Internet and/or other remote servers and networks. The platform can include a transceiver 406 that, in the present embodiment and other embodiments, may be part of or may be coupled to a network interface 407 that is capable of coupling with one or more networks or communications interfaces. The transceiver 406 and the network interface 407 may be operably coupled to a processor 408 that can be an application specific integrated circuit (ASIC), or other processor, microprocessor, logic circuit, data processing device, or the like. The processor 408 can execute programs, applications, or the like, that may reside in program space 410. The programs can be developed in accordance with an application programming interface ("API") layer that can be used to develop programs, applications or the like. The program space 410 can interface with data or any other resident programs in the memory 412 such as an operating system or the like. The memory 412 can include read-only or random-access memory (RAM and ROM), EEPROM, flash memory cards, or any memory common to computer platforms. The platform 302 also can include a local database 314 that can hold applications, user preferences, user identification information, group identification information, and other data. The local database 314 can be any secondary storage device as known in the art, such as magnetic media, EEPROM, optical media, tape, soft or hard disk, flash memory, or the like. The platform 302 in some exemplary embodiments components can also be operably coupled to external devices such as a wired or wireless, or wired and wireless network interface connection 322, display 324, keyboard 321, headset 323, and other components as is known in the art.

It should be noted that the wireless communication between the access terminal 102 and the RAN 120 as described herein, and the access terminals, such as the dispatch console and the network and other access terminals as described herein, including in FIG. 3A, FIG. 3B and FIG. 3C can be carried out based on different technologies, such as code division multiple access (CDMA), WCDMA, time division multiple access (TDMA), frequency division multiple access (FDMA), orthogonal frequency division multiple access (OFDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and as known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
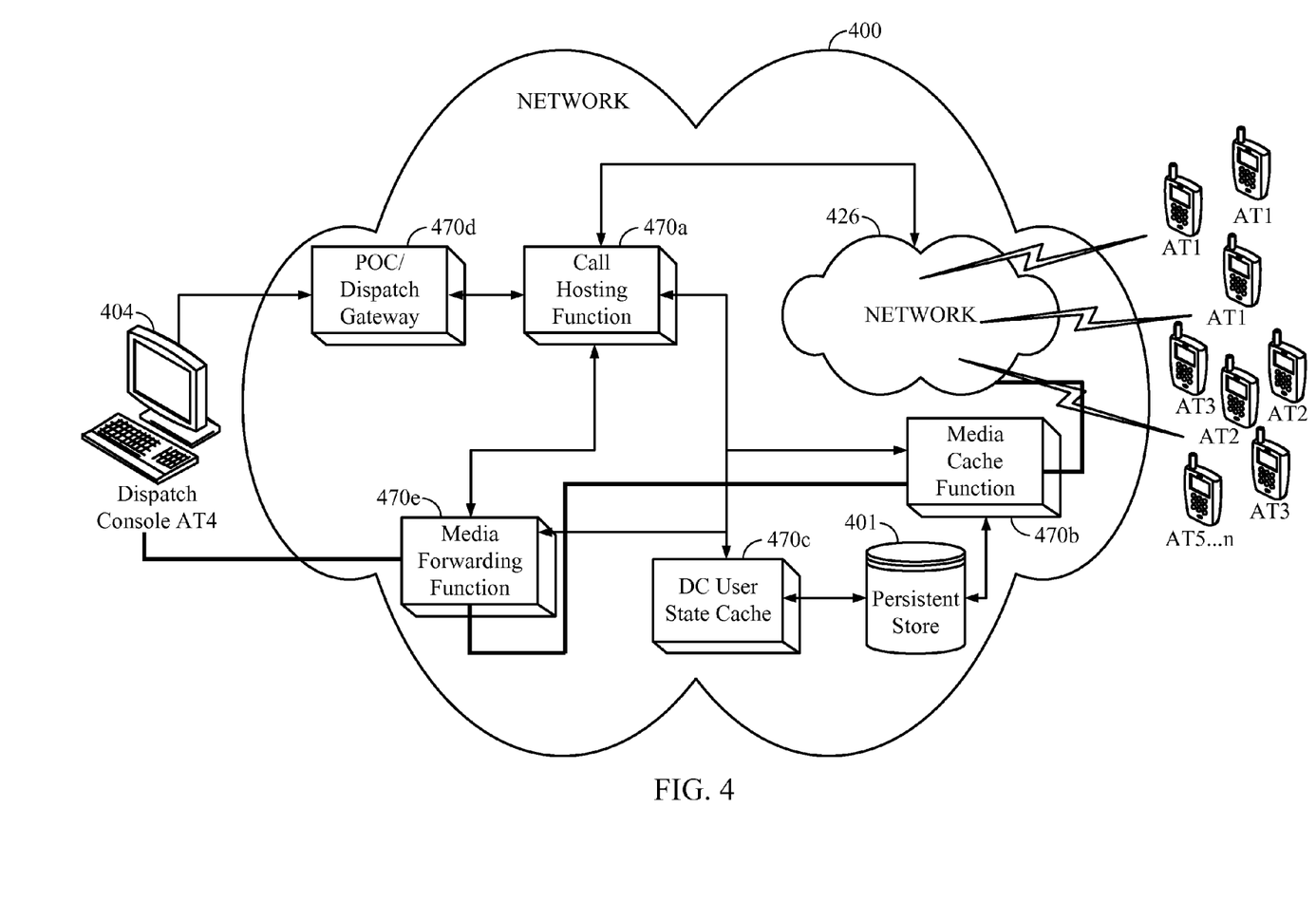
FIG. 4 is a diagram illustrating portions of an exemplary network illustrating an exemplary dispatch console AT4 communicating with a wireless communication system.

Referring to FIG. 4, an example is provided of an arrangement of an exemplary dispatch console (DC) AT4 404 communicating with wireless communication system elements in the context of, for example, wireless network 400. The carrier network 426 can further be connected to various access terminals such as AT1, AT2, AT3, and AT5 ... n. While shown separately, the DC AT4 404 can be considered as a form of access terminal and, more particularly can be a dispatch console, for example, as described herein above with reference to FIG. 3B. The DC AT4 404 may communicate with an entity for conducting operations in accordance with exemplary embodiments such as application server AS 470, shown in the figure as an arrangement of PTT Network components, for example, a call hosting function 470a, media cache function 470b, DC user state cache 470c, dispatch gateway 470d and media forwarding function 470e. Also, while the call hosting function 470a, media cache function 470b, DC user state cache 470c, dispatch gateway 470d and media forwarding function 470e are each illustrated as structurally separate servers, one or more of these servers may be consolidated in at least one embodiment of the invention. Referring to FIG. 4, the DC AT4 404 may monitor direct calls such as a call between two calling parties, an ad hoc call, or a closed group call such as a call that potentially includes more than two calling parties. In the present embodiment, a PTT application or client may reside on DC AT4 404 along with the dispatch gateway 470d. It will be appreciated that during caching as described herein, information can be stored with the cached content such as time stamp information or information regarding whether the cached information is new information, such as information regarding a new call, or information representing an update to cached information associated with an existing call or the like.

The DC AT4 404 can have special privileges; for example, the ability to monitor calls, the ability to join multiple calls simultaneously, and the ability to allow a user of DC AT4 404 to switch/join/leave multiple calls. The DC AT4 404 may be deployed at control rooms and other critical locations and can be operated by a user having, for example, a broad authority/view of the PTT groups/environment. Further, the DC AT4 404 may also have a User Interface (UI) which can facilitate any of the above functions.

A recovery protocol utilized in one exemplary embodiment may be implemented in whole or part in hardware or software that resides, for example, on DC AT4 404 as well as the dispatch gateway 470d. The dispatch gateway 470d can detect when the DC AT4 404 enters a fault or failure state such as a software crash, system restart or reboot, power failure, or the like, and can execute a procedure, a process, an algorithm, or the like, that triggers the start of caching of, for example, call state information, and, in some embodiments, other information such as the members of a call, or group information, or the like, when it detects the irregular condition of DC AT4 404.

Further, the recovery protocol utilized between the DC AT4 404 and the dispatch gateway 470d can prevent data loss that normally occurs when the DC AT4 404 enters the fault or failure state by restoring the DC AT4 404 and the UI back to the previous state, such as the state prior to the fault or failure state, by exchanging cached call state data. Further, the user of the DC AT4 404 may also be able to restore the DC AT4 404 and the UI back to the previous state through operation of interface controls or other controls. The recovery protocol may also restore each of the dispatch calls that the DC AT4 404 was part of, update DC AT4 404 call states for each call to reflect any changes that may have occurred while the DC AT4 404 was offline, such as while in the fault or failure state, update the user statuses of call members or users that are or were monitored by the DC AT4 404 during the previous state, update the UI to remove call entries for any calls that may have ended while the DC AT4 404 was offline, to seamlessly switch to another DC AT4 404 while carrying over all the call-state information related to the DC User, or other such remedial or restorative activity.

In one exemplary embodiment, during the period while the DC AT4 404 is offline, the dispatch gateway 470d, call hosting function 470a, media cache function 470b, DC user state cache 470c and media forwarding function 470e can provide recorded media or other media content, such as streaming media content, to the DC AT4 404 for each call. Thus, the dispatch gateway 470d can inform the call hosting function 470a that the DC AT4 404 has entered a fault or failure state and provide an opportunity for any data associated with the DC AT4 404 to be cached by the DC user state cache 470c and the media cache function 470b. The call hosting function 470a may then inform users such as AT1, AT2, AT3, AT5 ... n that are associated with DC AT4 404 of the fault or failure state and the caching functions carried out, for example, by DC user state cache 470c and the media cache function 470b, can begin. A recovery algorithm can be implemented, for example, on the DC AT4 404 that can use the DC AT4 404 user preferences, a dispatch gateway recovery algorithm, and cached call state information to arrive at a final state that can be presented to the UI of DC AT4 404 after recovery.

The DC AT4 404 and the dispatch gateway 470d may use a keep-alive protocol between each other that may enable the system 100 to detect the "health" of the DC AT4 404. Further, a keep-alive protocol can allow the DC AT4 404 to convey its current call state and other preferences to the dispatch gateway 470d.

The DC user state cache 470c may be responsible for monitoring and cache calling all call state information for all calls that a DC AT4 404 is a part of, or a predetermined set of calls which are marked as high priority, or a set conveyed by the DC AT4 404 to the dispatch gateway 470d using the keep-alive protocol. The DC user state cache 470c can be triggered by the DC AT4 404 entering the fault or failure state.

The DC user state cache 470c can interact with the dispatch gateway 470d to start and stop caching of session data for a particular DC AT4 404. The DC user state cache 470c can be responsible for deciding which call states to cache as well as which media sessions to record. The DC user state cache 470c can work in conjunction with the call hosting function 107a to keep all cached user state data updated. The DC user state cache 470c can also interact with the media cache function 107b and media forwarding function 107e in order to record media. Further, user state data can include a set of calls/sessions for each DC AT4 404 that needs to be cached, data representing exact call states for each of the calls/sessions in the abovementioned set, data representing the state of each of the users in each of the calls/sessions, and timestamps of when the caching started and when the data was last updated. It is further possible, as will be appreciated, for the caching of a rolling window of state and other information when no failure is detected such that restoration of the state prior to the failure can be more comprehensively provided. When the failure is detected caching can begin and would include contents prior to the failure. The amount of prior content would be determined based on factors such as the size of the window, the storage capacity and the like.

The media cache function 470b may be responsible for recording media for specific calls and can be controlled by the DC user state cache 470c. The media cache function 470b can be triggered by the DC AT4 404 entering the fault or failure state.

The persistent store 401 may be used to store data that can also be stored in the DC user state cache 470c and the media cache function 470b. Further, the persistent store 401 can be used mainly for media types. For example, if the DC AT4 404 was in a fault or failure state for more than five to six minutes, then the media cache function 470B could perform checkpoints on intermediate data such that the persistent store 401 could convert audio streams to audio files, or multimedia streams to multimedia files. When the DC AT4 404 exits the fault or failure state, the persistent store 401 could send the DC AT4 404 media files to the DC AT4 404. The DC AT4 404 has the option of playing back the stored media files in order to see what media data was missed while the DC AT4 404 was in the fault or failure state.

Figure 5:
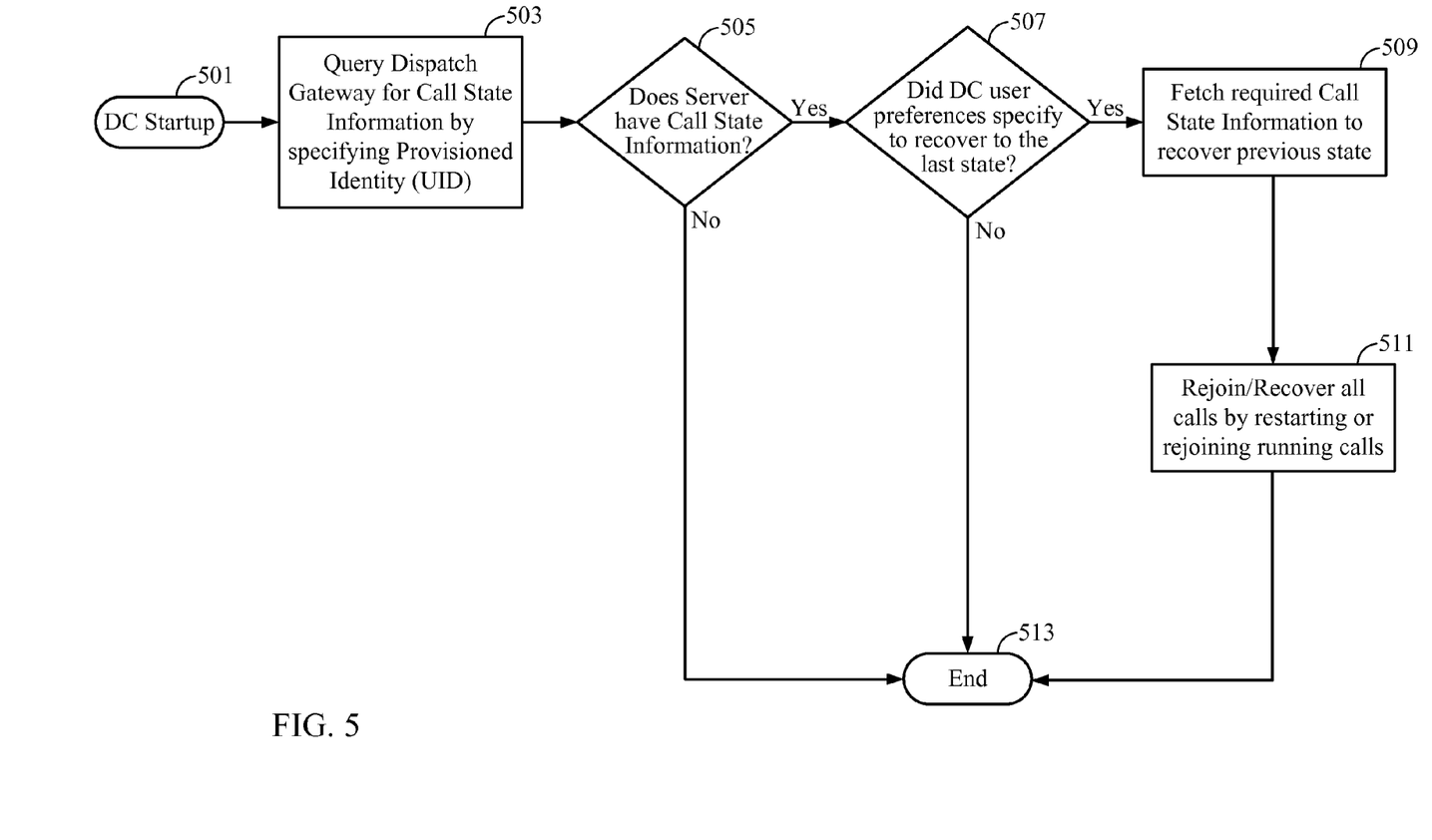
FIG. 5 is a flow chart illustrating an exemplary recovery procedure implemented on a dispatch console AT4 of FIG. 4.

Referring to FIG. 5, an exemplary recovery algorithm that can be implemented on the DC AT4 404 is illustrated. The recovery algorithm can use the DC AT4 404 user preferences, the dispatch gateway recovery algorithm, and cached call state information to arrive at a final UI state that is presented to the DC AT4 404 after recovery. After the start of the recovery algorithm at 501, the DC AT4 404 sends out a query to the dispatch gateway 470d asking for call state information by specifying a provisioned identity (UID) at 503. The dispatch gateway 470d can then notify the DC AT4 404 if the dispatch gateway 470d has call state information at 505. It should be noted that the dispatch gateway 470d typically knows that the DC AT4 404 call connection did not end cleanly. If the dispatch gateway 470d does not have call state information, then the recovery algorithm can end at 513. However, if the dispatch gateway 470d does have call state information, then the recovery algorithm proceeds to 507. The DC AT4 404 can then ask the user or can check the user preferences to see if the DC AT4 404 wants to recover the last state prior to the fault or failure state at 507. If the user preferences so indicate, or if the user of the DC AT4 404 does not request or indicate a preference to recover to the last state, then the recovery algorithm can end at 513. However, if the user preferences so indicate, or the user of the DC AT4 404 requests or indicates a preference to recover the last state, then the recovery algorithm proceeds to 509 where the recovery protocol between the DC AT4 404 and the dispatch gateway 470d will begin. During the process of user recovery, the dispatch gateway 470d will further fetch the required call state information and pass it along to the DC AT4 404 at 509 whereupon the previous state information will be recovered.

It should be noted that the DC AT4 404 may subsequently rejoin and recover all previous calls by restarting or rejoining running calls at 511. The DC AT4 404 may, for example, if calls are still active, resynchronize with or, for example, if calls dropped, replay streamed or stored media for active calls. Further, instead of sending all media files to the DC AT4 404, the dispatch user state cache 470c and the media cache function 470b may send real-time protocol (RTP) and real-time streaming protocol (RTSP) port addresses that specify where the DC AT4 404 could obtain streaming recorded media from the gateway. Sending port addresses as described may reduce the amount of data overhead sent over the various networks. While the recover procedure is indicated as ending at 513, it will be appreciated that the procedure can be repeated whenever there is a failure or similar event, or when a state reset is necessary or desired.

Figure 6:
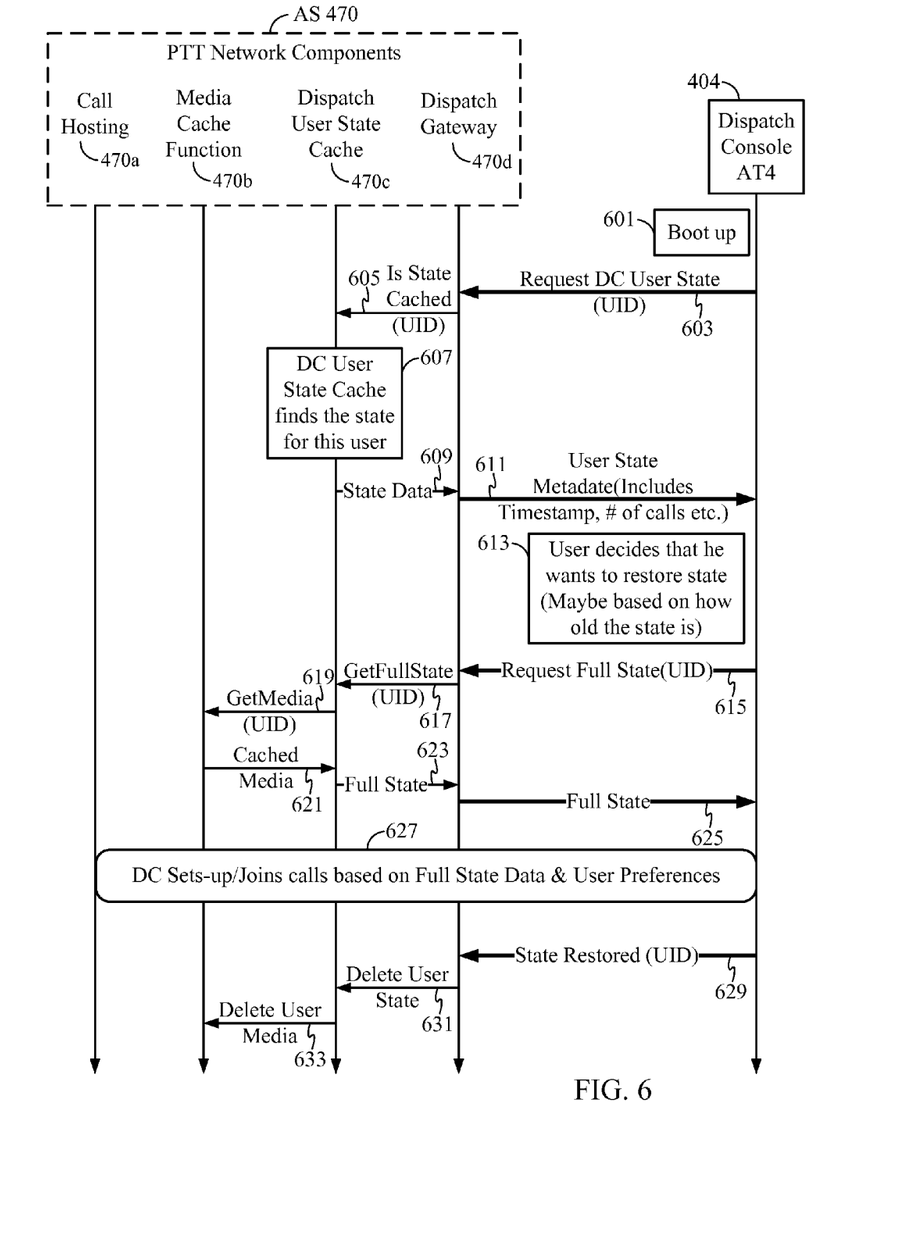
FIG. 6 is a message flow diagram illustrating an exemplary recovery call flow for restoring a call state.

Referring to FIG. 6, an embodiment of an exemplary recovery call flow is illustrated where a call state is restored. In an exemplary scenario, the application server 470 may be communicating with a DC AT4 404. The application server 470 may include PTT Network components, for example, a call hosting function 470a, media cache function 470b, DC user state cache 470c, dispatch gateway 470d and media forwarding function 470e. While the call hosting function 470a, media cache function 470b, DC user state cache 470c, dispatch gateway 470d and media forwarding function 470e are each illustrated as structurally separate servers, one or more of these servers may be consolidated in at least one embodiment of the invention.

After the DC AT4 404 initially boots up, for example, at 601, the DC user state or states are requested from the dispatch gateway 470d at 603. The dispatch gateway 470d requests the states from the DC user state cache 470c, provided that the UID state was cached, at 605. The DC user state cache 470c then finds the state for the user in accordance with the specific UID at 607. The DC user state cache 470c then sends the state data to the dispatch gateway 470d at 609. The dispatch gateway 470d can then send the user state metadata to the DC AT4 404 at 611. It should be noted that the metadata may represent or include information such as the number of calls, timestamp information, how long the data is to be cached and the like. The metadata can be coded or otherwise compressed as will be appreciated. By caching the state in connection with a UID, it will be appreciated that a user of a dispatch console, such as a call station manger or the like, can switch to a new dispatch terminal to restore the call without effect provided the new dispatch terminal is equipped to make the proper connection to the network, and the like.

The DC AT4 404, or the user of the DC AT4 404 may decide that restoration of the previous state is desired at 613. If the DC AT4 404 wants to restore the full state information, the full state information can be requested, including UID, from the dispatch gateway 470d at 615. The dispatch gateway 470d then requests the full state information, including UID, from the DC user state cache 470c at 617. The DC user state cache 470c then requests media associated with the UID from the media cache function 470b at 619. The media cache function 470b then sends the cached media associated with the UID to the DC user state cache 470c at 621. The DC user state cache 470c then sends the full state data to the dispatch gateway 470d at 623. The dispatch gateway 470d can then send the full state data to the DC AT4 404 at 625.

It will be appreciated that after receiving the full state information, the DC AT4 404 then sets up and rejoins calls based on the state data and user preferences at 627. The DC AT4 404 informs the dispatch gateway 470d that the state has been restored at 629, whereupon, for example, any caches associated with the states can be cleared. The dispatch gateway 470d then requests the DC user state cache 470c to delete state information associated with the UID at 631. The DC user state cache 470c then requests the media cache function 470b to delete user media associated with UID at 633.

Figure 7:
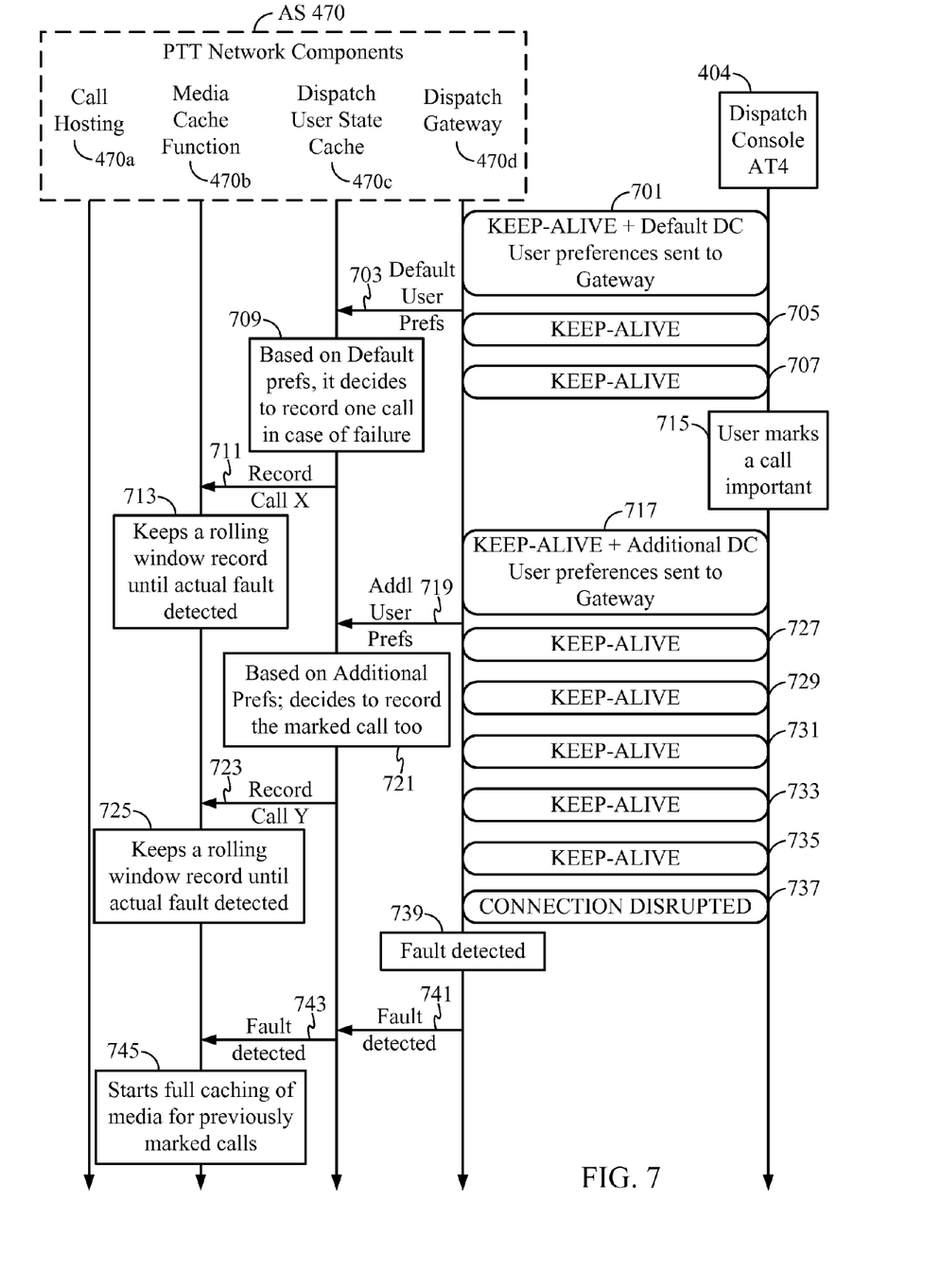
FIG. 7 is a message flow diagram illustrating another exemplary call flow for changing and setting user preferences.

Referring to FIG. 7, an exemplary call flow is illustrated for changing and setting user preferences. Further, the user preferences may allow the user of DC AT4 404 to monitor different parameters and to change priority levels of various calls. For example, if the DC AT4 404 experiences a fault or failure state, all of the callers such as AT 1, AT 2, AT3, AT5 ... n, may end the call. However, the user preferences may be set such that when the DC AT4 404 leaves the fault or failure state, the call can be restarted with some or all of the callers AT 1, AT 2, AT3, AT5 ... n depending on the configuration. It will be further appreciated that the user preferences may be used in conjunction with the keep-alive protocol in order to change user preferences. For example, the keep-alive protocol may used while the DC AT4 404 is functioning normally, such that the DC AT4 404 user can click on a particular icon of the call to mark/edit the user preferences or importance level of the users in the call. The user preferences information can be conveyed across the network via the keep-alive protocol so that the rest of the network knows that the DC wants to track a certain call when the DC goes down. Alternatively, the user preferences can be dynamically altered such that while the call is ongoing. For example, the DC AT4 404 user can mark the preferences or priority levels of various calls to specify importance such that upon initialization, the DC AT4 404 can send its rules to the dispatch gateway 470d specifying the preferences or priority levels.

Accordingly, the DC AT4 404 can send a keep-alive packet including default DC user preferences to the dispatch gateway 470d at 701. The dispatch gateway 470d can send the default user preferences to the DC user state cache 470c at 703. The DC AT4 404 and the dispatch gateway 470d can send additional keep-alive packets between each other at 705 and 707. The DC user state cache 470c may then decide that based on the user preferences, one of the calls can be recorded in case of failure at 709. Thus, the DC user state cache 470c can send a "record call X" message to the media cache function 470b at 711. Afterwards, the media cache function 470b can keep a rolling window record open until an actual fault or failure state is experienced by the DC AT4 404 at 713.

Subsequently, the DC AT4 404 user may mark a specific call as important at 715. Accordingly, the DC AT4 404 can send additional keep-alive packet and additional DC user preferences to the dispatch gateway 470d at 717. The dispatch gateway 470d can send the additional user preferences to the DC user state cache 470c at 719. Accordingly, based upon the additional user preferences, the DC user state cache 470c may decide to record the marked call as well at 721. Thus, the DC user state cache 470c can send a "record call Y" message to the media cache function 470b at 723. Afterwards, the media cache function 470b can keep a rolling window record open until an actual fault or failure state is experienced by the DC AT4 404 at 725.

The DC AT4 404 and the dispatch gateway 470d can send additional keep-alive packets between each other at 727, 729, 731, 733, 735 and 737. The dispatch gateway 470d can detect a fault or failure state experienced by the DC AT4 404 at 739. The dispatch gateway 470d can send a message to the DC user state cache 470c at 741 notifying that a fault has been detected. The DC user state cache 470c can then send a fault detected message to the media cache function 470b at 743. Subsequently, the media cache function 470b can start full caching of media for any calls previously marked in the user preferences at 745.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A communication terminal for restoring a multiple call session after a fault, comprising:
   a user interface including an input device and an output device;
   a network interface coupling the communication terminal to a network including multiple access terminals associated with multiple calls of the multiple call session; and
   a processor coupled to the user interface and the network interface, the processor configured to:
   transmit a request to a server in the network, the request including a user identifier associated with a user of the communication terminal, the request for a state of the multiple call session associated with the user identifier prior to the fault;
   receive a response from the server including the state of the multiple call session associated with the user identification, the state displayed on the output device, the displayed state including individual states of the multiple calls of the multiple call session; and
   restore the multiple call session on the communication terminal based on the state of the multiple call session and based on input received from the input device.

2. The communication terminal according to claim 1, wherein the communication terminal includes a dispatch console, the server includes a dispatch gateway and a cache and wherein the processor is further configured to transmit the request to the dispatch gateway, the dispatch gateway retrieving the state of the multiple call session from the cache based on the user identification.

3. The communication terminal according to claim 2, wherein the server includes a media cache, wherein the multiple call session includes media content that is stored in the media cache when the fault is detected, and wherein the response includes the media content retrieved from the media cache.

4. The communication terminal according to claim 1, wherein the input received from the input device includes user preference information associated with each of the multiple calls, the processor configured to restore ones of the multiple calls of the multiple call session based on the user preference information.

5. The communication terminal according to claim 2, wherein the multiple call session includes a push to talk (PTT) multiple call session.

6. The communication terminal according to claim 1, wherein the processor is further configured to transmit a keep-alive message to the server, the keep-alive message including information associated with preferences for ones of the multiple calls of the multiple call session, and wherein, based on the preferences, the server caches the ones of the multiple calls.

7. The communication terminal according to claim 6, wherein the preferences include a call importance preference for the ones of the multiple calls.

8. The communication terminal according to claim 1, wherein the server includes a cache that stores information associated with the state of the multiple call session according to a rolling window.

9. A server for restoring a multiple call session in a communication network after a fault, comprising:
   a call host coupled to multiple access terminals associated with the multiple call session;
   a gateway coupled to the call host and to a communication terminal; and
   a cache coupled to the call host and the gateway, the cache configured to store state information associated with the multiple call session;
   wherein the server is configured to:
   receive a request from the communication terminal including a user identifier associated with a user of the communication terminal, the request for a state of the multiple call session associated with the user identifier; and
   transmit the state to the communication terminal;
   restore the multiple call session with the call host and ones of the multiple access terminals based on input received from the communication terminal.

10. The server according to claim 9, wherein the state includes the individual state of ones of multiple calls associated with the multiple call session.

11. The server according to claim 9, wherein the communication terminal includes a dispatch console, the server includes a dispatch gateway and the cache and wherein the processor is further configured to transmit the request to the dispatch gateway, the cache storing information associated with the state of the multiple call session that is cached when the fault is detected in equipment associated with the user identifier.

12. The server according to claim 9, wherein the multiple call session includes media content and wherein the server further comprises a media cache configured to store information associated with the media content when the fault is detected.

13. The server according to claim 10, wherein the request includes user preference information associated with each of the multiple calls in the multiple call session, and wherein the server is configured to restore the multiple call session based on the user preference information.

14. The server according to claim 9, wherein the multiple call session includes a push to talk (PTT) multiple call session.

15. The server according to claim 10, wherein the server is further configured to receive a keep-alive message from the communication terminal, the keep-alive message including information associated with preferences for ones of the multiple calls of the multiple call session, and wherein, based on the preferences, the cache is configured to store the state of the ones of the multiple calls.

16. The server according to claim 15, wherein the preferences include a call importance for the ones of the multiple calls.

17. The server according to claim 9, wherein the cache is configured to continuously store the state information associated with the multiple call session according to a rolling window.

18. A method of recovering a multiple call session after a fault in a communication terminal, the method comprising:
processing a request for a state of the multiple call session, the request including a user identifier associated with the multiple call session and the communication terminal, the multiple call session including multiple calls among the communication terminal and multiple access terminals through a network;
transmitting the request to a server in the network, the request including the user identifier associated with a user of the communication terminal, the request for the state of the multiple call session associated with the user identifier prior to the fault;
receiving a response from the server including the state of the multiple call session associated with the user identification, the state including individual states of the multiple calls of the multiple call session; and
selectively recovering ones of the multiple calls of the multiple call session based on information included with the request and the response to the request including the state of the multiple call session.

19. The method according to claim 18, wherein the information included with the request includes user preferences.

20. The method according to claim 19, wherein the user preferences include an indication of the ones of the multiple calls that are important.

21. The method according to claim 18, further comprising:
detecting the fault in the communication terminal; and
caching information associated with the multiple call session.

22. The method according to claim 18, wherein the information included with the request includes the ones of the multiple calls marked as important, the method further comprising:
continuously recording in accordance with a rolling window while the multiple call session is active; and
caching information associated with the ones of the multiple calls of the multiple call session marked as important when the fault is detected.

23. The method according to claim 18, wherein the processing the request further includes transmitting the request from the communication terminal to the server in the network the information included with the requesting including identification of ones of the multiple calls of the call session marked as important.

24. An apparatus for restoring a multiple call session after a fault, comprising:
means for processing a request for a state of the multiple call session the request including a user identifier associated with the multiple call session and a communication terminal, the multiple call session including multiple calls among the communication terminal and multiple access terminals through a network;
means for transmitting the request to a server in the network, the request including a user identifier associated with a user of the communication terminal, the request for a state of the multiple call session associated with the user identifier prior to the fault;
means for receiving a response from the server including the state of the multiple call session associated with the user identification, the state including individual states of the multiple calls of the multiple call session; and
means for selectively recovering ones of the multiple calls of the multiple call session based on information included with the request and the response to the request including the state of the multiple call session.

25. The apparatus according to claim 24, wherein the means for processing a request includes a dispatch console for:
transmitting the request to a server in the network, the request including a user identifier associated with a user of the communication terminal, the request for the state of the multiple call session associated with the user identifier prior to the fault; and
receiving the response from the server including the state of the multiple call session associated with the user identification, the state including individual states of the multiple calls of the multiple call session.

26. A non-transitory computer-readable medium comprising instructions, which, when executed by an apparatus in a wireless communications system, cause the apparatus to:
process a request for a state of a multiple call session the request including a user identifier associated with the multiple call session and a communication terminal, the multiple call session including multiple calls among the communication terminal and multiple access terminals through a network;
transmitting the request to a server in the network, the request including a user identifier associated with a user of the communication terminal, the request for a state of the multiple call session associated with the user identifier prior to the fault;
receiving a response from the server including the state of the multiple call session associated with the user identification, the state including individual states of the multiple calls of the multiple call session; and
selectively recover ones of the multiple calls of the multiple call session based on information included with the request and the response to the request including the state of the multiple call session.

* * * * *